(12) United States Patent
Chen (10) Patent No.: US 9,036,560 B2
(45) Date of Patent: *May 19, 2015

(54) HYBRID ROUTING AND FORWARDING SOLUTION FOR A WIRELESS SENSOR NETWORK

(71) Applicant: Weixiang Chen, Westford, MA (US)

(72) Inventor: Weixiang Chen, Westford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/290,195

(22) Filed: May 29, 2014

(65) Prior Publication Data

US 2014/0269429 A1    Sep. 18, 2014

Related U.S. Application Data

(63) Continuation of application No. 13/230,126, filed on Sep. 12, 2011, now Pat. No. 8,774,094.

(51) Int. Cl.
| | | |
|---|---|---|
| *H04L 12/28* | (2006.01) | |
| *G06F 15/177* | (2006.01) | |
| *G06F 15/173* | (2006.01) | |
| *H04W 40/24* | (2009.01) | |
| *H04W 4/00* | (2009.01) | |
| *H04L 12/751* | (2013.01) | |
| *H04L 12/24* | (2006.01) | |
| *H04L 29/06* | (2006.01) | |
| *H04L 29/08* | (2006.01) | |

(52) U.S. Cl.
CPC ......... *H04W 40/246* (2013.01); *H04L 12/2861* (2013.01); *H04L 41/0213* (2013.01); *H04L 29/06* (2013.01); *H04L 29/08072* (2013.01); *H04L 41/12* (2013.01); *H04L 12/2859* (2013.01); *H04W 4/006* (2013.01); *H04L 45/02* (2013.01)

(58) Field of Classification Search
CPC .............. H04L 29/06; H04L 29/08072; H04L 41/0213
USPC ........................... 370/328, 254; 709/220, 223
See application file for complete search history.

(56) References Cited

U.S. PATENT DOCUMENTS

| | | | |
|---|---|---|---|
| 7,378,953 B2 | 5/2008 | Coronel | |
| 7,590,611 B2 | 9/2009 | Hur | |
| 7,649,884 B1* | 1/2010 | Ahmed et al. | ................ 370/390 |
| 7,675,863 B2 | 3/2010 | Werb | |
| 7,701,858 B2 | 4/2010 | Werb | |
| 7,782,188 B2 | 8/2010 | Coronel | |
| 2007/0201427 A1* | 8/2007 | Lee et al. | ...................... 370/351 |
| 2008/0164996 A1 | 7/2008 | Coronel | |
| 2008/0247539 A1 | 10/2008 | Huang | |
| 2009/0029650 A1 | 1/2009 | Shon et al. | |
| 2009/0154481 A1 | 6/2009 | Han | |
| 2009/0154482 A1* | 6/2009 | Ham et al. | ..................... 370/408 |
| 2009/0207769 A1 | 8/2009 | Park et al. | |
| 2011/0033054 A1 | 2/2011 | Garcia morchon et al. | |
| 2011/0317017 A1 | 12/2011 | Shin et al. | |
| 2012/0182943 A1* | 7/2012 | Bahr et al. | ..................... 370/328 |

* cited by examiner

*Primary Examiner* — Faruk Hamza
*Assistant Examiner* — Abu-Sayeed Haque
(74) *Attorney, Agent, or Firm* — Lambert & Associates; Gary E. Lambert; David J. Connaughton, Jr.

(57) ABSTRACT

A hybrid routing and forwarding solution for a mobile wireless sensor network is provided. This invention allows each node of the wireless sensor network to move in random directions in a three dimensional space. The invention seeks to minimize resource consumption while optimizing routing and forwarding in a wireless sensor network.

20 Claims, 11 Drawing Sheets

Fig. 11

HYBRID ROUTING AND FORWARDING SOLUTION FOR A WIRELESS SENSOR NETWORK

PRIORITY CLAIM

This application is a continuation utility patent application which claims the benefit to and priority from non-provisional utility patent application Ser. No. 13/230,126 filed on Sep. 12, 2011.

BACKGROUND OF THE INVENTION

1. Field of the Invention

The present invention relates generally to routing and forwarding solutions. More particularly, the present invention relates to a hybrid routing and forwarding solution for mobile or fixed wireless sensor networks.

2. Description of Related Art

A wireless sensor network (WSN) is a self-organizing wireless network that consists of distributed devices with sensors commonly referred to as "nodes". The sensors are application specific. They are used for monitoring environmental conditions, such as sound, temperature, vibration, pressure, motion or pollutants at different locations. The wireless sensor network was originally motivated by military applications. It is now widely used in many industrial, agricultural, medical and other civilian applications.

In addition to the sensors, each device in a WSN is equipped with elements such as a radio transceiver, microcontroller, flash memory, antenna, energy source and so on. A WSN device is typically low data rate, low cost and low power devices. The low cost of a WSN is a constraint on system resources such as energy, memory, processor and bandwidth.

There are usually three types of WSN devices, i.e. the coordinator (or sink), router and end device. The first two devices have routing functionality. Both devices have ability to find proper routes to forward packets to desired destinations. An end device has no routing ability, it only communicates with a specific router that is called the parent of the end device.

If the routing condition changes so that the original path becomes unavailable, the routers are able to find a new path to deliver the packets to the destination. Currently, the WSN devices are usually installed in fixed locations. However, if the devices were installed inside a moving target, the routing among the wireless nodes becomes a challenge.

The routing protocols and forwarding processes are the major resource consumers of the software in a WSN. These modules require a good deal of memory, CPU time and a power resource. The wireless sensor nodes on the other hand, are typically low data rate, low cost and low power devices. Therefore, it is a challenge to provide routing and forwarding functionality in a WSN. Furthermore, it is an even bigger challenge in a mobile WSN since the physical locations of the nodes are changed dynamically. The mobile WSN creates significant amount of variables and requires extra resources and mechanisms.

Currently, there are many ways to implement routing and forwarding functionality in a mesh WSN. Most of them are data centric protocols because an address centric (with unicast shortest path) approach is commonly thought to take much more system resources and electric power. The data centric protocols usually are coordinator centric. They ignore the roles of the individual nodes. Yet the forwarding path is less deterministic. Below are typical examples of existing approaches. The first three are basically data centric, however the flooding mechanism works in an address centric way as well:

1. Flooding the data over the WSN. This approach is simple but it can create implosion problems. The same copies are flooded over the area until they reach the destination.
2. Sensor Protocols for Information via Negotiation (SPIN). This protocol forwards the data via negotiation that consumes less power than flooding, but the SPIN is not reliable, it cannot guarantee the delivery of the data.
3. Gossiping. At every step each node forwards data only to one neighbor which is selected randomly. The neighbor must then forward the data back to the sender. The Gossiping avoids flooding but is inefficient.
4. AODV (Ad-hoc On-demand Distance Vector) based routing protocol. This protocol uses route discovery and selection mechanisms. Its router request and route reply process is effective, but not economical.
5. Conventional address centric shortest path routing. This approach finds the shortest path and eliminates the flooding completely but requires constant routing advertisement that is expensive and consumes a good deal of resources and electric power.
6. Typical solutions for mobile WSN: mobile base station based solutions, mobile data collector based solutions, and rendezvous based solutions. The restriction for these existing solutions is that all the nodes must be fixed except a coordinator node.

Therefore, what is needed is a method of routing and forwarding that may efficiently allow intelligent and dynamic routing while eliminating waste. Moreover, the solution should allow for a mobile wireless sensor network.

SUMMARY OF THE INVENTION

The subject matter of this application may involve, in some cases, interrelated products, alternative solutions to a particular problem, and/or a plurality of different uses of a single system or article.

This invention seeks to meet the challenges described above by providing an innovative hybrid solution of routing and data forwarding in both mobile and fixed mesh WSN.

The semantics of the hybrid property in this invention implies four aspects. Firstly, it means a mix of broadcast and unicast forwarding that work together to deliver the functionality; secondly, it allows the data from the control plane and data plane to coexist in a single hybrid packet; thirdly, it provides both address centric and data centric protocol features. Lastly, it supports both event driven and query driven modes.

The event driven forwarding is usually triggered when the sensor nodes detect something that must be reported. The data is sent unsolicited to the coordinator or service center.

The query driven forwarding is triggered by a query from the coordinator, service center, or any nodes within a WSN. The query is sent periodically or randomly, it can be destined for a specific node, a group of nodes or all the nodes over the area.

Note that there are specific limitations in a WSN due to hardware and system constrains. E.g. the distance between adjacent nodes and bandwidth of the nodes are restricted. For mobile WSN, the speed of mobile nodes and the number of nodes moving simultaneously is limited. This is especially true when the traffic flows over a WSN frequently.

This solution is especially appropriate for a fixed or mobile WSN where the events or queries happen infrequently. However, it may work in any WSN implementation.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

This invention provides a unique routing and forwarding solution for a mesh WSN. It is powerful, efficient, flexible and reliable. In particular, it supports both fixed and mobile mesh WSN. The mechanisms created in this invention are highly dynamic and time sensitive which makes it a good fit for mobile conditions and an appropriate solution for a mobile WSN. Existing WSN protocols limit the mobility of a WSN to the coordinator only. In contrast, this solution extends the mobility to any Full Function Device (FFD) nodes in a WSN.

This invention uses a number of hybrid approaches to coordinate different mechanisms intelligently so that the services are maximized while the resource consumption is minimized.

This invention provides a unique hybrid approach with four flavors, i.e. a hybrid between broadcast and unicast forwarding; a hybrid between address centric and data centric features, a hybrid of control data and user data in a single packet; and a hybrid of event driven and query driven mode.

This invention utilizes a combination of broadcast and unicast forwarding. To generate a broadcast packet, one option is to encode user data and routing advertisement in a single packet so that the unicast best routes are created quietly while the broadcast packet reaches the destinations. The unicast routes are destined for the initiator of the broadcast. The initiator could be a coordinator or other node in the network.

In a conventional network, the separation of the control packets and data packets is essential, because the high speed forwarding becomes impossible otherwise. Wireless Sensor Networks, however, are low bandwidth, low speed networks. Data packets are extremely small, sometimes smaller than a control packet. Furthermore, the speed of the data forwarding is not an issue. Therefore, the combination of a data packet and control packet becomes feasible.

The routing advertisement usually consumes significant amounts of system resource and electric energy. In general, it takes a full cycle of a broadcast to propagate a routing advertisement over an ad hoc network. This problem is compounded in that it happens periodically. The overhead is considerable.

Figure 1:
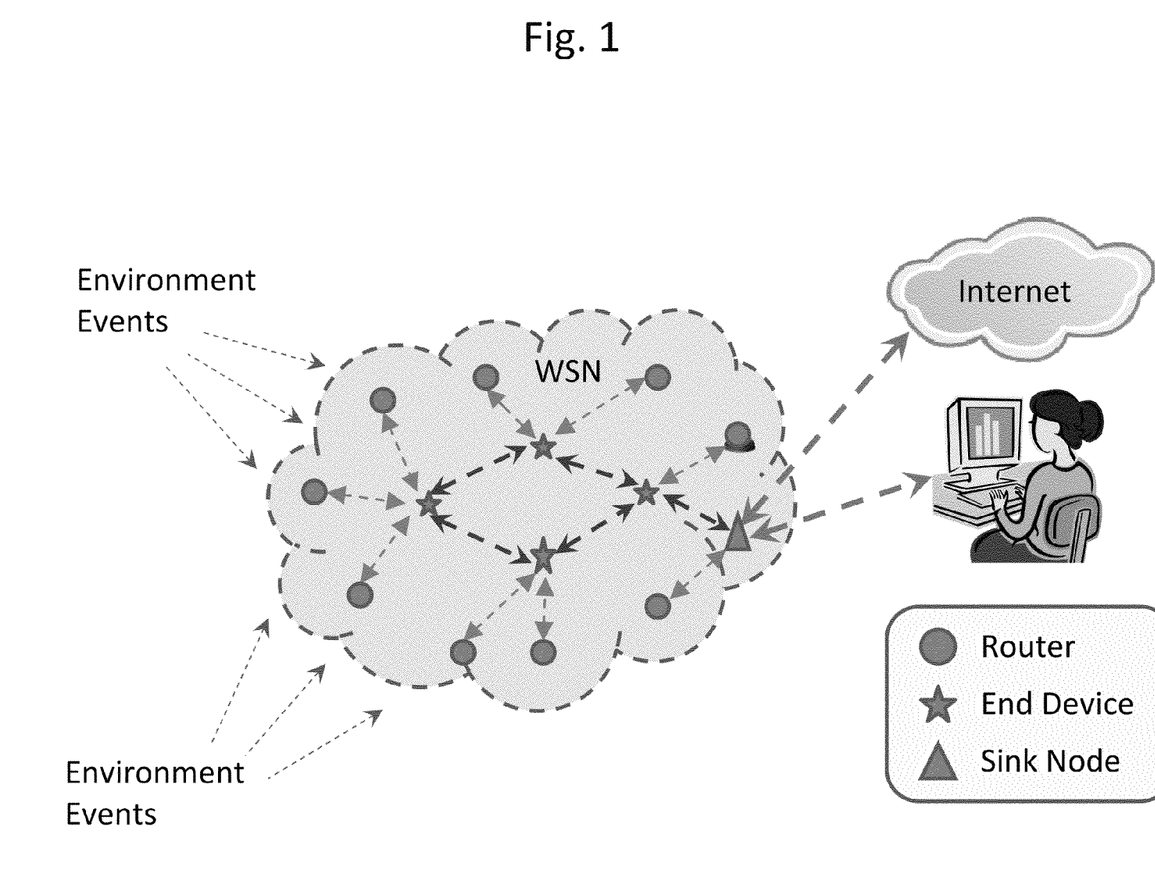
FIG. 1 provides an embodiment of a wireless sensor network.

FIG. 1 shows an embodiment of a WSN. The WSN consists of a plurality of network nodes including routers, shown as circles; end devices shown as stars; and a sink node shown as a triangle. These nodes are in communication with each other. The sink node allows communication directly to a central computer, or out to the internet. The network nodes are impacted by environment events which are sensed by the nodes.

This invention eliminates the regular routing advertisement. The propagation happens in a need base only and routing data is piggybacked by broadcast packets. In summary, this invention provides a way to enjoy the advantage of the unicast best routes without the huge overheads it takes.

This solution further creates the concept of smart metrics that are encoded by conventional and real time information. The smart metric is a leverage that controls the forwarding process intelligently and dynamically. It can shape real time traffic and optimize the forwarding process. The unicast routes created during the broadcast represent the real time best paths rather than the traditional shortest paths.

This invention uses unique, flexible smart metrics that control the forwarding process intelligently and dynamically. A number of flavors may be encoded into the smart metrics, for example: the number of hops, link quality and electric power reserved.

In one smart metric embodiment, to simplify the logics, the link quality can be measured with M levels. The M is the highest quality. Likewise, the reserved electric power is measured with N levels. N is the highest level. Both M and N values are configurable.

If an ordered set of nodes [N1, N2 ... NL] defines path P, the number of the nodes is L, the direct link [Ni, Ni+1] is a sub path of P, then the cost of path P is:

$$C\{P\} = k1(L-1) + k2 \sum_{i=1}^{L-1} (M - LQL\{[Di, Di+1]\}) + k3 \sum_{i=1}^{L-1} (N - PR\{Di\})$$

Where LQL{[Di, Di+1]} is the level of link quality between node Di and Di+1; PR{Di} is the reserved power level of node Di; k1, k2 and k3 are the coefficients that are used to adjust the contributing level of different flavors. The k1, k2 and k3 values are configurable, and might be changed from application to application.

In this embodiment, the formula shows that the cost is lower if the number of hops is less, and if link quality and power reserving level are higher. The link quality and power reserving level are changed dynamically, which in turn affects the smart metric dynamically.

This solution could be viewed as an address centric protocol to some extent. Indeed, this hybrid approach covers the features of address centric as well as data centric protocols. E.g. it allows a loose data aggregation during the data forwarding. The data aggregation is a feature provided by data centric protocols. It reduces the number of packets traveling through a WSN. This solution allows the aggregation to be in an arbitrary manner. Hence the forwarding processes become extremely flexible.

This invention supports a unicast best path in a unique way so that the large overhead of prior art route advertisement is avoided. In addition, the smart metric provides opportunities to optimize the route dynamically with real time information.

This invention supports mobile WSN that allows the coordinator and other FFD nodes to move in any direction. Note that the mobility is usually limited to the coordinator only in the WSN routing protocols of the prior art.

The broadcast mechanisms in this invention are distinct from existing approaches. Examples of the differences may include:

A loose aggregation of the user data reduces the number of packets flowing over the WSN without sacrificing any functionality. This aggregation is arbitrary so the flexibility of the process is maximized.

A broadcast flooding is considerably expensive. In this invention, the broadcast is triggered by an event or query only. Furthermore, a broadcast packet can piggyback routing advertisements.

This invention excludes the constant route advertisements and route discovery processes.

A regular routing advertisement takes a full cycle of a broadcast in an ad hoc network and it happens constantly. A route discovery mechanism takes two way processes, i.e. a broadcast forwarding in one direction and a unicast forwarding in reverse direction.

In the present invention, the broadcasting is optimized. The forwarding loops are completely eliminated and the same packet will not be repeatedly broadcasted by each node.

During the broadcasting, multiple copies can be forwarded over a WSN. This is an overhead. In this invention, some overhead is unavoidable. However, broadcast overhead is used to increase the reliability of the transportation.

Unlike most of the routing protocols, this invention excludes the constant route advertisements and route discovery processes. This approach dramatically reduces the consumption of electric power and CPU resources. In a typical Wireless Sensor Network, the transmission of a packet consumes several times of electric power that a CPU consumes at same time. The constant route advertisements and maintenances are the most expensive software processes within a WSN device. The route discovery is a considerable overhead as well.

This invention uses a hybrid approach of broadcast and unicast forwarding and a hybrid approach of routing advertisement and data forwarding in one packet. The broadcast packet plays two roles: the data delivery and routing advertisement. In particular, the broadcast session is driven by the events and queries. The unicast session is usually for the sensor nodes to forward their responses to the querist.

In this invention, the unicast routes are usually not maintained before sending a query message or an unsolicited event since conventional router advertisements and discovery mechanisms are excluded. Instead, this invention broadcasts query messages or unsolicited events over the Wireless Sensor Network until the messages reach the desired destinations.

It is uncommon to broadcast the user data in conventional network, nevertheless a query or event message is as small as a typical control packet in a Wireless Sensor Network. The total cost to broadcast a query or event message is similar to a single run of route advertisement. The cost is less than a router discovery process considering the discovery process is a two way process with the broadcast in one direction and unicast in reverse direction.

It should be noted that the broadcast for conventional distance vector route advertisement is processed at a regular basis. Alternatively, the broadcast performed with this invention is at a need basis. The route discovery process is also at a need basis, but it does not contribute to data transmission. It is an overhead when the process could be excluded. In general, applications that conduct infrequent queries and unsolicited event messages take the most of the advantages of this invention in terms of power and resource saving.

In this invention, a broadcast packet includes routing section and an application section. The routing section has all the flavors of routing advertisement in a typical distance vector routing protocol. The application section accommodates various user data, such as a query message or an event report message. While receiving a broadcast packet, the routing module of a node processes the routing section, this is similar to a distance vector routing protocol. The application layer processes the application section based on application details.

The broadcast packet is transferred from a node to its neighbor just like a conventional broadcasting. A unicast route toward the initiator of the broadcast is created during the broadcasting. The route is refined during propagation. The best next hop is selected and installed in the forwarding table. The selection of the path is determined by a smart metric that is decided by, for example, number of hops, the link quality, and power level etc. A timer or a time stamp is generated and bounded to the new route. The route will be aged out when the timer expires. If the unicast route entry for the initiator is already there, the route will be updated. The timer is refreshed as well.

Figure 2:
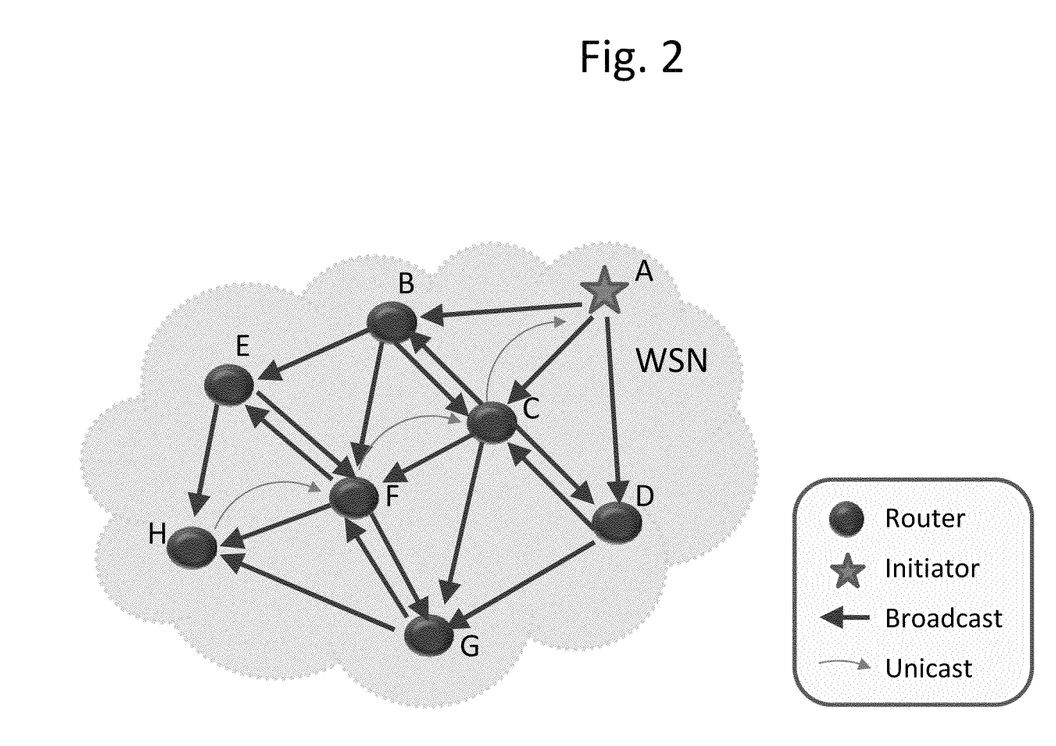
FIG. 2 provides an embodiment of the formation of a unicast path based on a broadcast from an initiator node.

In FIG. 2, the star A is the initiator of the query; the balls represent the routers within a Wireless Sensor Network; the node H is the targeted device of the query; the straight arrows show the directions of the broadcast; the curved arrows show the direction of the best unicast path that is created during the broadcast. The node H is expected to use the newly created unicast path to send its response messages to querist A.

Each node has a node ID in a WSN. Because a network address is unique within a WSN, it is used as a node ID. A specific sequence number is generated and associated with each message in the node that initiates the message. The combination of a node ID and sequence number uniquely identifies a broadcast or unicast packet. This pair is stored in the routing entry, and is used to identify and prevent the broadcast loop or repeated forwarding. Upon receiving a broadcast packet, the node does an acceptance and loop check by looking at the pair. If the packet does not pass acceptance and loop check, it is discarded quietly without any further actions. Otherwise, the node remembers the pair and the process continues.

In the prior art, there are a number of traditional ways to prevent broadcast loop. The simplest way is to keep track the number of hops a packet has traveled. The packet is discarded if it reaches a threshold. Another way is to add the address of every node traveled to the packet. The packet is discarded if the current node is in the traveled list.

The first way is essentially a damage control, the loop might happen, but is the extent of the loop is under control. The second approach stops the loop completely, but the overhead is considerable because the size of a packet is usually limited in a WSN.

The loop detection mechanism in this invention does not have disadvantages from either of the traditional approaches. If an originator's ID and the sequence number matches with existing pair and the cost to arrive current node is larger, the incoming packet is either from a worse path or from a loop. See FIG. 11 and further discussion below.

Figure 11:
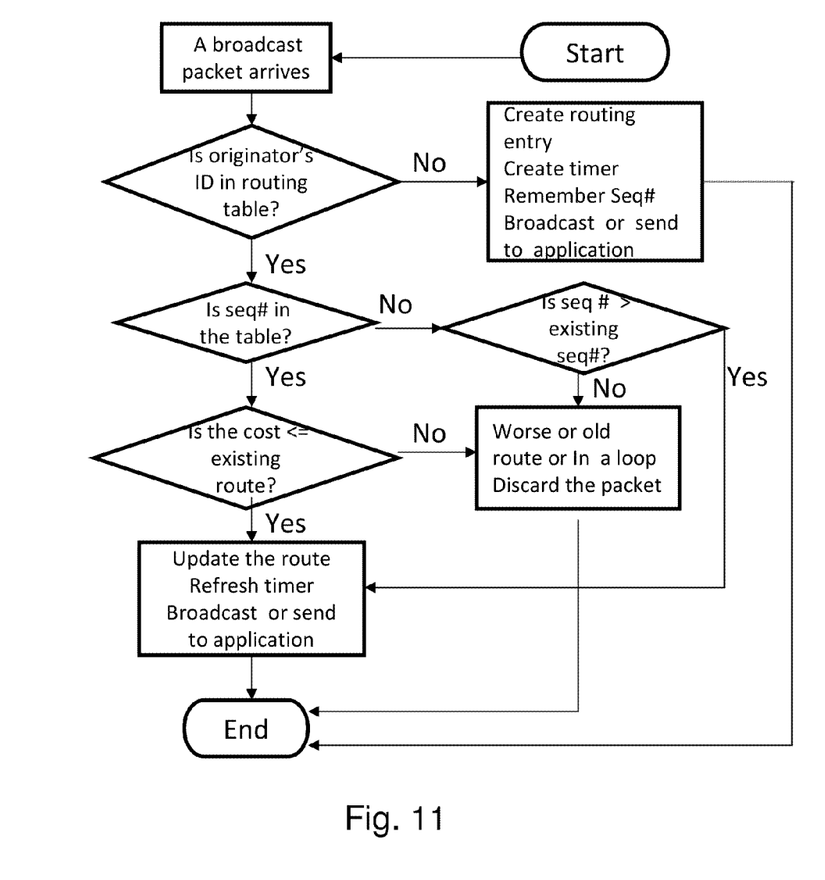
FIG. 11 provides an embodiment of the procedures of the acceptance and loop check, and how an incoming broadcast packet is processed.

FIG. 11 shows the procedures of the acceptance and loop check, and how an incoming broadcast packet is processed. If the ID of the packet's originator is not in the routing entry, a new entry and its timer (or time stamp) is created. The sequence number is stored. If the current node is the target node, the packet is sent to the application module for further processing. Otherwise, broadcast continues. If the originator's ID is already in the routing entry, but the sequence number is smaller than stored number, this packet is too old, and will be discarded. If the sequence number is greater than the stored number, the packet will be processed by routing module for routing update. If the current node is the targeted node, the packet is sent to the application module for further processing, otherwise, the broadcast continues.

If the sequence number exists, but the cost to arrive at the current node is bigger based on the routing section of the packet, it is from a loop or a worse path, the packet is discarded. If the cost is smaller, the packet will be processed by the routing module for routing update. If the current node is the targeted node, the packet is sent to the application module for further processing, otherwise, the broadcast continues.

A coordinator or destination node can receive multiple copies of a same packet from a single broadcasting cycle. This is due to the fact of flooding. Flooding is a waste to some extent. In this invention, the multiple copies will be used for reliability purpose that increases the successful rate in terms of packet delivery. If the coordinator or initiator fails to receive the responses from a recipient within a predefined time period, the initiator resends the query messages to the recipient.

For an event driven message, the packet will transferred to the coordinator or destination via a unicast route if such a route exists. Otherwise, the broadcast is performed and a unicast best route toward the initiator can be optionally created as it is described previously. The event message is propagated from a node to its adjacent node until reaching the coordinator or destination node.

In FIG. 2, although the node H is the target node of the query, every node that traveled by the broadcast query message takes this opportunity to generate the best routing entry for initiator A. As a result, a multipoint to point unicast tree rooted at the initiator is created.

Figure 3:
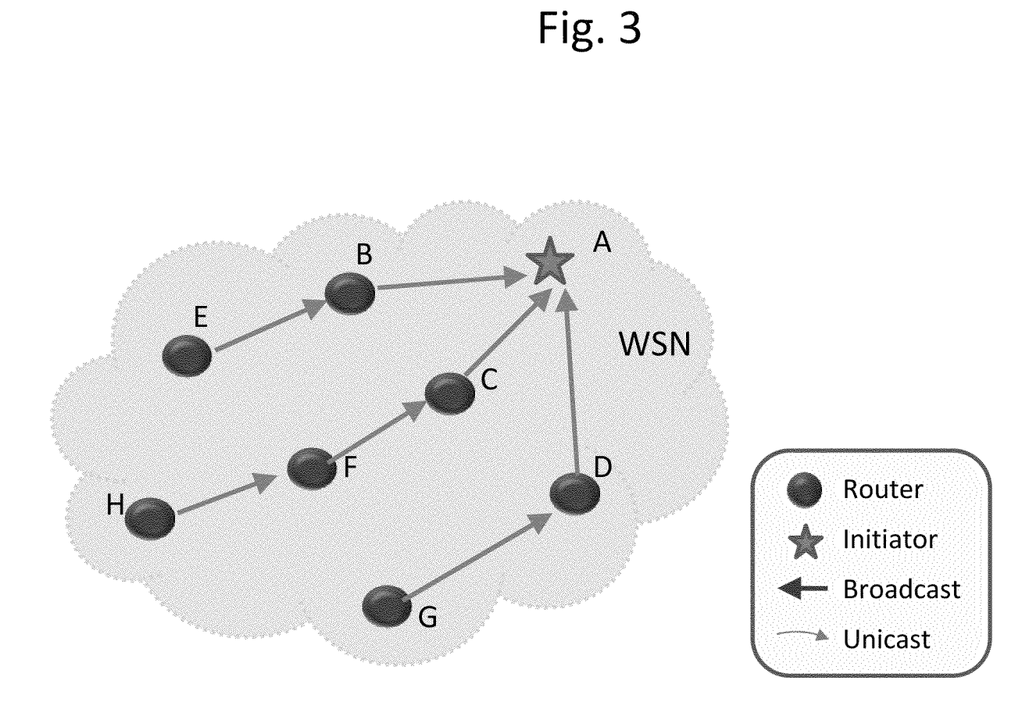
FIG. 3 provides an embodiment of a multipoint to point unicast tree between nodes rooted at the initiator node.

One embodiment of this process is shown in FIG. 3. The star is the initiator of the querist; the balls are the nodes in the Wireless Sensor Network; the node H is the targeted node of the query; the straight arrows show the directions of the unicast path, they form a multipoint to point tree. While delivering the query message to the destination, the broadcast is really a route advertisement for initiator A, because the broadcast messages are the hybrid packets that carry both routing information and user data.

As it is described previously, the new routing entry will be aged out and removed eventually. If the unicast route is for the coordinator, it might be treated differently. For example the time interval for aging out might be longer. In that case, an unsolicited event has a better chance to use a unicast path to deliver event message to the coordinator. This is an optimization. However, this is not recommended in a mobile WSN. A unicast route might become stale quickly in a dynamic mobile environment. The event message could be sent to nowhere with a stale route.

This invention supports a mobile WSN where every node is allowed to move in any direction. With this solution, the regular routing advertisement and maintenance is excluded. The task of keeping track of the mobile routes is eliminated. On the other hand, a broadcast packet should always catch a mobile node somewhere as long as the node is located within the WSN. This allows a mobile node to catch the fresh route with less delay. Therefore, a response message always uses a newly created or updated unicast route.

Figure 4:
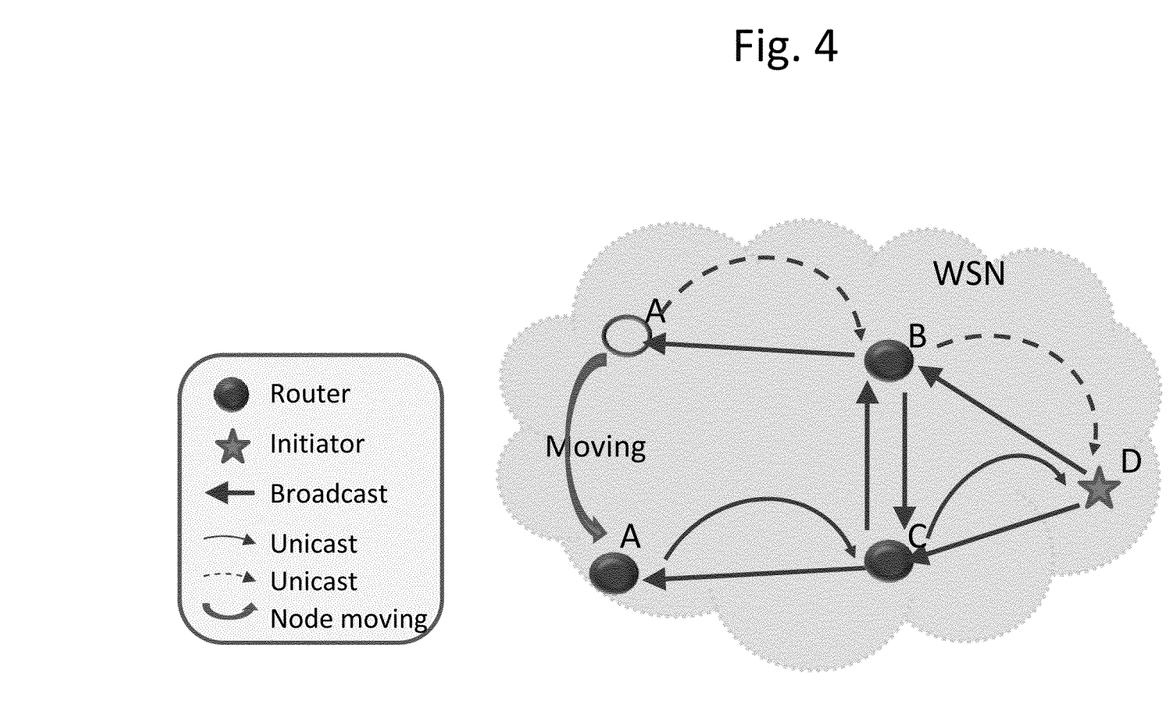
FIG. 4 provides an embodiment of node mobility and route adjustment.

In FIG. 4, node A is an arbitrary node in a WSN. It was originally located in top left corner. If node A is near that spot when a broadcast packet arrives, node B advertises the broadcast packet to it and receives the response message from it. If node A moves to the lower left corner when broadcast packet arrives, node C will advertise the broadcast packet to it and will receive the response message from it.

This invention introduces a new concept called a data vehicle, and may also be referred to as a moving container. A data vehicle is a new method to do packet aggregation over a Wireless Sensor Network.

When a WSN node is ready to send a packet to the coordinator, it can create a data vehicle and load the message onto the vehicle. This message is the first rider, called the original message. The data vehicle might go out of the air via unicast routes or broadcast forwarding, but the unicast forwarding is the first choice as long as the unicast route is available. During the propagation, the messages from the relay nodes are allowed to get on the vehicle and be forwarded to the destination along with the rest of the messages on the vehicle. As a result, the coordinator is able to receive a list of messages from a single packet. Such aggregation processes may vary from application to application and can be constrained by the specific limitations of the WSN such as a packet size or maximum transmission unit (MTU). The aggregation is beneficial because it greatly reduces the number of active packets in a Wireless Sensor Network and reduces the sending and receiving operations that consume significant amounts of electric power. It should be noted that to transmit a packet consumes several times of electrics of a CPU consumes at same amount of time. Therefore, the fewer packets sent, the better.

This aggregation is in a loose manner. It is an option, not mandatory. A message can choose to take a ride from data vehicle, or go out of air by itself. This is similar to a real world bus, one might choose to get on a bus if it arrives at a good timing and the destination matches. You might not wait a bus if it takes too long. On the other hand, since the packet length is limited in a WSN, a message might not have a chance to get on a particular data vehicle. This is also similar to a real world bus that is full, which can not take more passengers.

There are two types of data vehicles in this invention: a query specific data vehicle and a wild card data vehicle. The former is used to collect response messages after the coordinator issues a query to multiple nodes or all the nodes. This data vehicle is marked as vehicle_q that follows a unicast path. The latter is used to collect any response messages and unsolicited event reports for the coordinator. This data vehicle is marked as vehicle_w that might be forwarded via broadcast or unicast, but unicast is the first choice.

For a wild card data vehicle, each unsolicited event message on the vehicle may be reviewed and processed by each node that is traveled to by the vehicle. The acceptance check and loop check will be performed on each message of the data vehicle. This is the same as if an unsolicited event message arrives on a random node. As a result, the message might be removed from the vehicle and be discarded. At extreme case, if the vehicle becomes empty then the vehicle is discarded as a whole.

For a query driven broadcast, the coordinator or a specific node initiates a query message that is broadcasted to the WSN. During the propagation, a unicast route toward the initiator is created. The responses from targeted nodes are forwarded to the initiator via the unicast routes.

If the query is sent to multiple nodes, an aggregation process is optionally performed for the responses. In this invention, the response messages are picked up by the query specific data vehicle when the packet is on its way toward the querist.

To do that, the targeted node refrains from replying to the query right away. Instead, the node creates a response message and an instance of a query specific data vehicle. This message gets on the vehicle as an original message. A timer or time stamp is created for the vehicle. When the timer fires, the vehicle goes out of the air and starts to collect response messages from other nodes on its way toward the coordinator.

Figure 5:
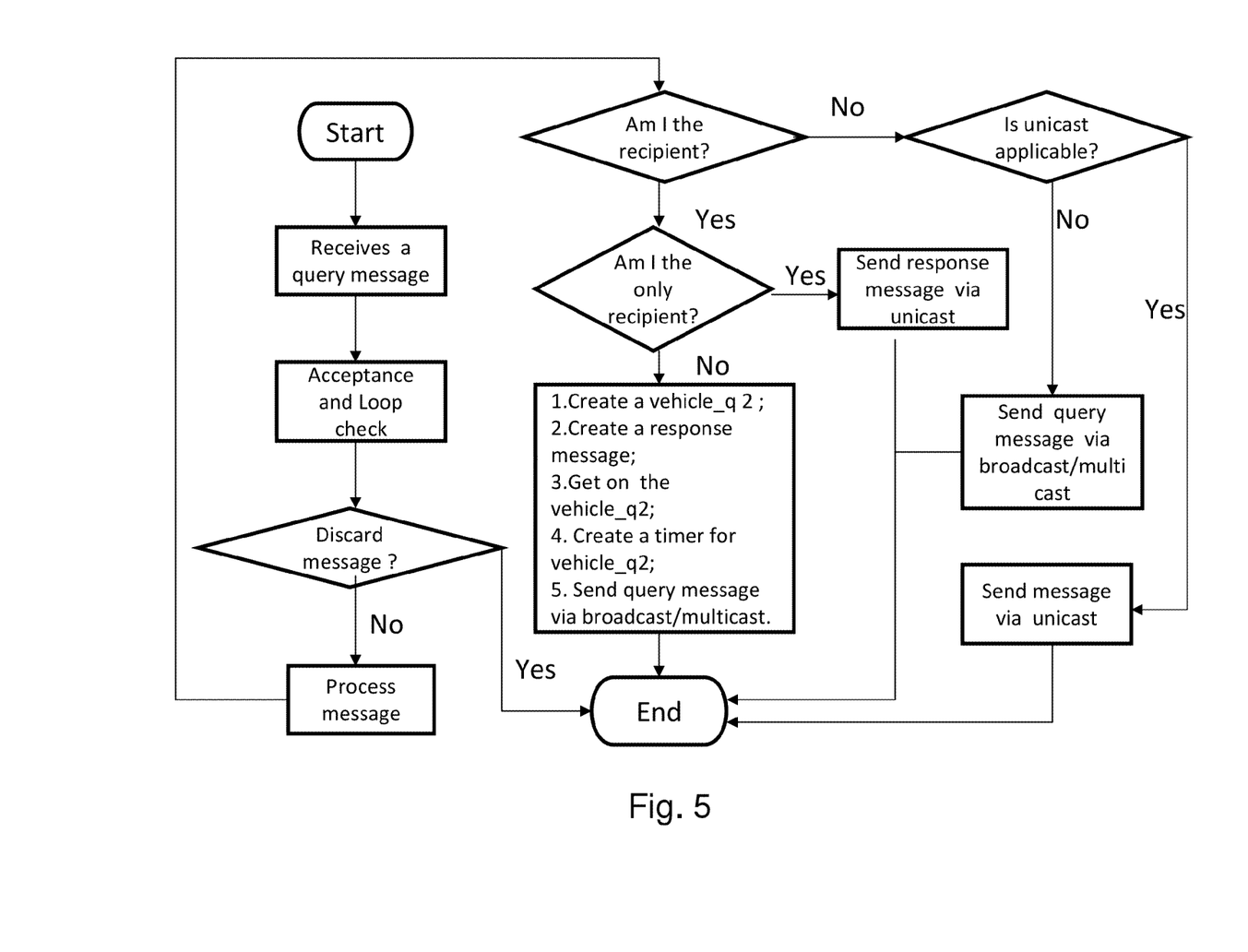
FIG. 5 provides an embodiment of the processes that are taken when a node receives a query message from the coordinator.

FIG. 5 shows the processes that are taken when a node receives a query message from the coordinator. As it is described previously, a typical query message arrives on a node via broadcast. An acceptance and loop check process is taken by looking at its source address and the sequence number of the message. If it does not pass the check, then the message is discarded. Otherwise, the routing module will process the query message by looking at routing section of the message. A routing entry for the coordinator might be created. If the current node is not the recipient, this message is sent via a unicast if that is applicable. Otherwise, it will be sent via broadcast or a multicast. The unicast is applicable if the destination of the message is a single node and a unicast route entry is available in current node.

If the current node is one of the recipients then the query message is forwarded to the application layer for further processing. If the current node is the only recipient, a response message will be sent immediately via the unicast route that is created by the broadcast. If the query message is destined for a number of nodes, then a response message and a query specific data vehicle are created. This vehicle is called vehicle_q2 here. A timer or a time stamp is also generated for vehicle_q2. The query message is then sent out via broadcast or multicast.

Figure 6:
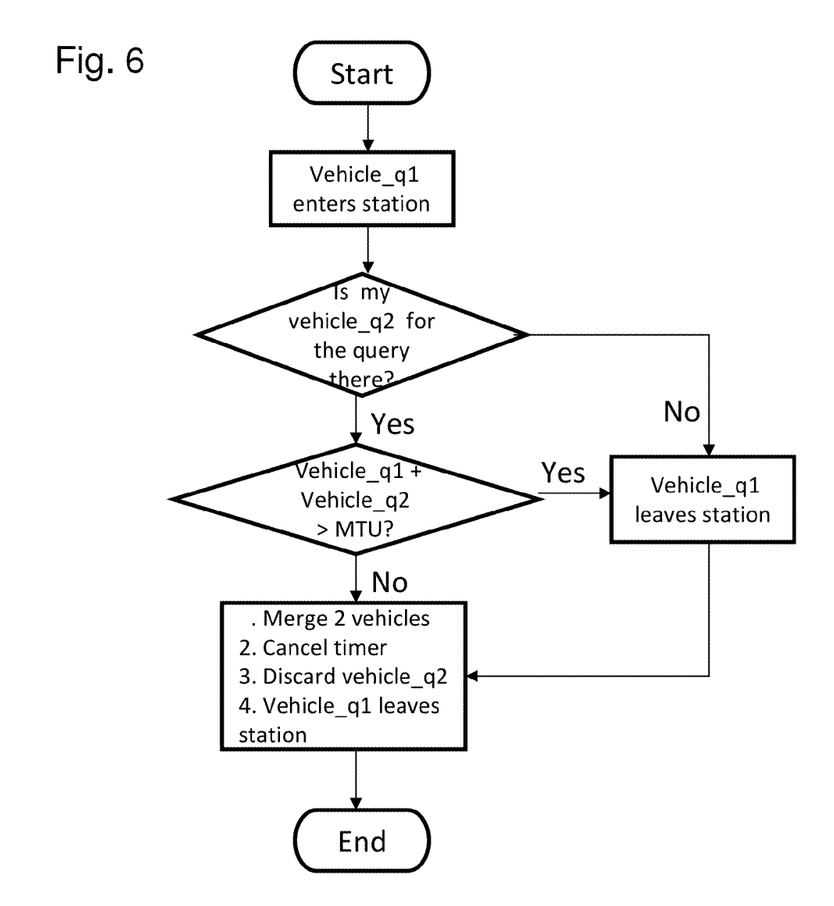
FIG. 6 provides an embodiment of the processes that are taken when a query data vehicle arrives on local node.

FIG. 6 shows the processes that are taken when a query data vehicle arrives on local node. Say it is vehicle_q1. Note that vehicle_q1 follows a unicast path that was newly created. If the corresponding vehicle_q2 for the same query (see FIG. 5) does not exist, then vehicle_q1 is sent immediately. The vehicle_q2 is not there for one of the two reasons: either the current node is not the recipient of the original query message, or the current node is the recipient, but the response message is already sent. If the corresponding vehicle_q2 does present, then the current node is one of the recipients and vehicle_q2's timer has not expired yet. In that case, if the total length of both vehicles great than local MTU value, the vehicle_q1 is sent immediately. The vehicle_q2 will wait for timer expiration or next incoming vehicle. If the sum is less than MTU value, then the messages on the vehicle_q2 will be moved to vehicle_q1. The vehicle_q2's timer will be canceled, and vehicle_q2 will be discarded. The vehicle_q1 is then sent via unicast path.

Figure 7:
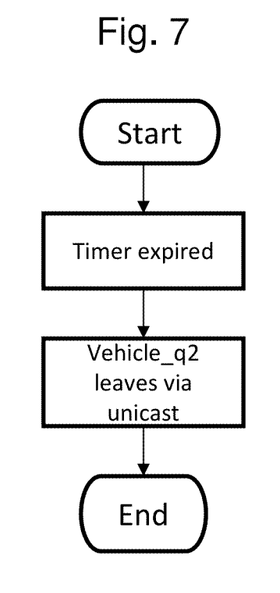
FIG. 7 provides an embodiment of the processes that are taken when vehicle_q2's timer fires.

FIG. 7 shows the processes that are taken when vehicle_q2's timer fires. The vehicle_q2 will be sent via unicast path that is generated when the original query message was processed.

For a wild card process, the messages on the data vehicle could be response messages or unsolicited event messages. In both cases, the destination of the messages is usually the coordinator. For each unsolicited event message on the vehicle, a unicast best route toward the initiator of the event message can be optionally created during the broadcast of the vehicle. If the option is enabled, each event message on the vehicle is processed by a routing module. The unicast routes toward event senders might be installed in the routing table. This is the same as receiving the unsolicited event message individually.

Figure 8:
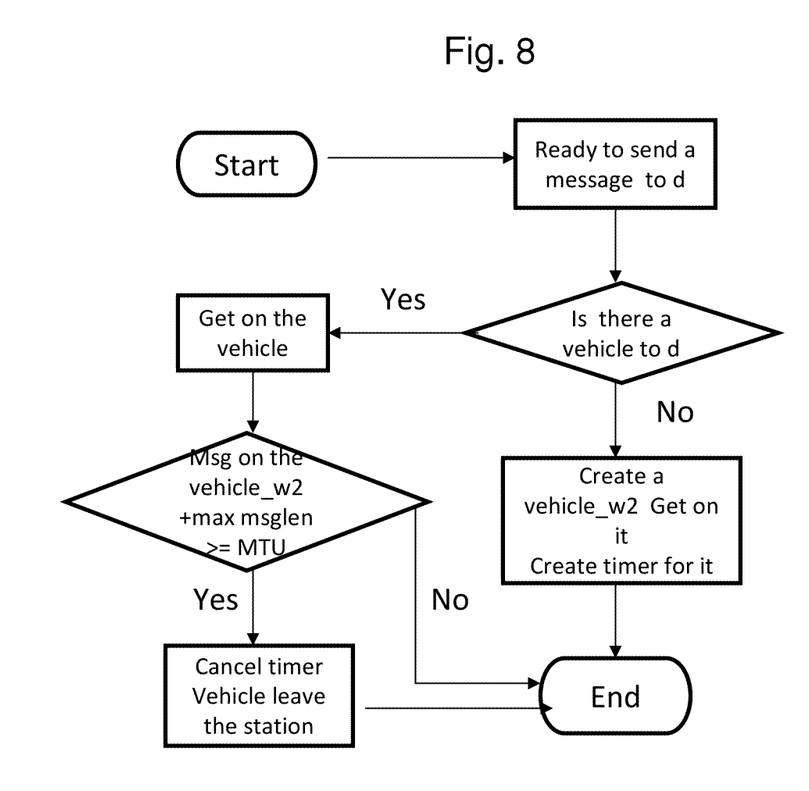
FIG. 8 provides an embodiment of the processes that are taken when a message is ready to be sent out.

FIG. 8 shows the processes that are taken when a message is ready to be sent out. The message could be a response message or an unsolicited event message. If a wild card data vehicle for the destination of the message is not available, an instance of such a vehicle is created. The vehicle is called vehicle_w2. The message gets on the vehicle as an original message, and a timer or a time stamp is created for the vehicle. If a wild card data vehicle for the same destination is already there, the message gets on the vehicle immediately. If the total length of the vehicle plus the maximum length of a response message or event message exceeds MTU value, the timer is canceled and the vehicle departs immediately since the room left on the vehicle might not enough for the next message.

Figure 9:
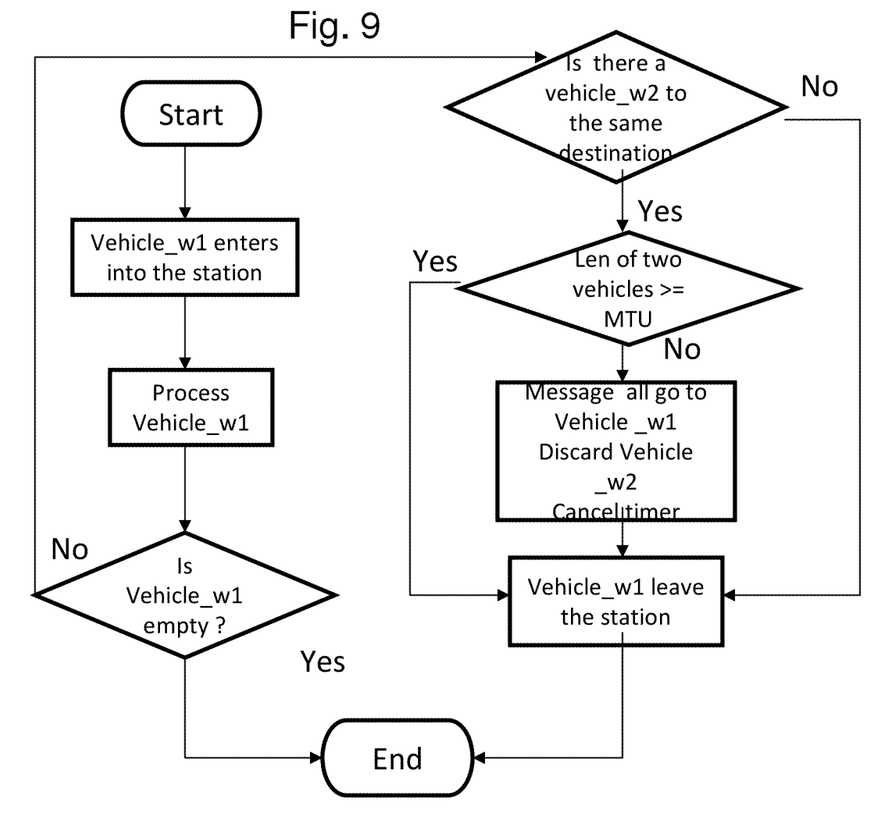
FIG. 9 provides an embodiment of the processes that are taken when a wild card data vehicle arrives on current node.

FIG. 9 shows the processes that are taken when a wild card data vehicle arrives on current node. Let's call it vehicle_w1. Each event message on vehicle_w1 will be reviewed for an acceptance and loop check. As a result, the messages might be discarded. If all the messages are to be discarded, the vehicle will be discarded as well. The remaining event messages will be processed by routing module. The unicast routes toward event senders might be optionally installed in the routing table. If a vehicle_w2 for the same destination of vehicle_w1 does not exist, vehicle_w1 is sent immediately. If such a vehicle_w2 presents and the total length of both vehicles is great than local MTU value, the vehicle_w1 is sent. The vehicle_w2 will wait for timer expiration or another incoming vehicle, whichever comes first. If the total length of both vehicles is less than MTU value, then vehicle_w2's messages are moved to vehicle_w1. The vehicle_w2 is discarded and its timer is canceled. The vehicle_w1 are sent afterwards.

Figure 10:
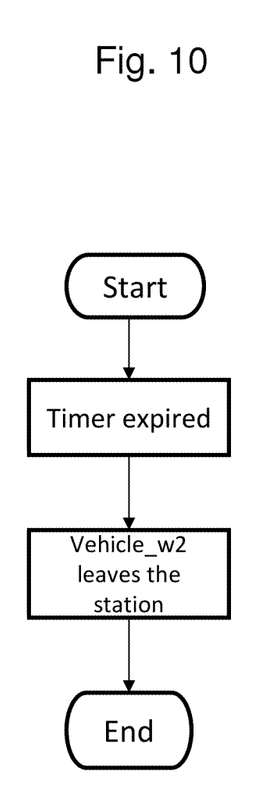
FIG. 10 provides an embodiment of the processes that are taken when vehicle_w2's timer fires.

FIG. 10 shows the processes that are taken when vehicle_w2's timer fires. The vehicle_w2 will be sent via unicast path if it exists, otherwise it is broadcasted.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A method of hybrid routing and forwarding for a wireless sensor network comprising the steps of:
broadcasting by an initiator node of the wireless sensor network, a broadcast packet of the broadcasting containing both a quantity of user data comprising at least one of a query and an event report message, and a quantity of routing advertisement data providing control data to nodes, the user data and routing advertisement data contained in the single broadcast packet;
forming a unicast route to the initiator node by a second node based on the quantity of routing advertisement data of the broadcast packet;

receiving the quantity of user data of the broadcast packet by the second node;

propagating the quantity of routing advertisement by the initiator node on an as-needed basis, wherein the quantity of routing advertisement data is incorporated into a packet containing the quantity of user data whenever the quantity of user data is broadcast; and processing by the second node, the broadcast packet to eliminate a broadcast loop.

2. The method of hybrid routing and forwarding for a wireless sensor network of claim 1 further comprising the steps of:

operating the initiator node and the second node as low power, low bandwidth wireless devices; and moving at least one of the initiator node and the second node from a first location to a second location.

3. The method of hybrid routing and forwarding for a wireless sensor network of claim 1 further comprising the step of forming a unicast route to the initiator node by the second node using a smart metric, the smart metric being calculated based on a number of hops between nodes, link quality, and electric power reserved.

4. The method of hybrid routing and forwarding for a wireless sensor network of claim 1 wherein the single broadcast packet is uniquely identifiable by a node ID of the initiator node and a sequence number generated with each message from the initiator node.

5. The method of hybrid routing and forwarding for a wireless sensor network of claim 1 wherein the step of propagating the quantity of routing advertisement is performed on a query driven as needed basis wherein the user data of the broadcast packet is a query directed to the second node.

6. The method of hybrid routing and forwarding for a wireless sensor network of claim 1 wherein the step of processing by the second node the broadcast packet to eliminate a broadcast loop further comprises the steps of:

determining that an originator ID of the broadcast packet is in a routing table of the second node;

determining that a sequence number of the broadcast packet is in the routing table of the second node;

determining that the route cost is greater than an existing route; and discarding the packet.

7. The method of hybrid routing and forwarding for a wireless sensor network of claim 1 further comprising the step of increasing reliability by utilizing a broadcast overlap formed by the step of broadcasting by an initiator node.

8. The method of hybrid routing and forwarding for a wireless sensor network of claim 1 further comprising the step of broadcasting, by the second node, a second quantity of user data and a second quantity of routing advertisement data in the event that the unicast route formed ages out.

9. The method of hybrid routing and forwarding for a wireless sensor network of claim 1 further comprising the step of forming a data vehicle packet by the second node to follow the unicast route to the initiator node; and forming a timer for the data vehicle packet by the second node.

10. The method of hybrid routing and forwarding for a wireless sensor network of claim 9 further comprising the step of adding a quantity of data destined for the initiator node to the data vehicle packet by a third node, wherein the initiator node, second node, and third node are all allowed to move in any direction.

11. The method of hybrid routing and forwarding for a wireless sensor network of claim 1 further comprising the step of forming a data vehicle packet by the second node to be broadcast to the initiator node; and forming a timer for the data vehicle packet by the second node.

12. The method of hybrid routing and forwarding for a wireless sensor network of claim 1 wherein the step of forming a unicast route to the initiator node by a second node is performed after receipt of the broadcasting, the unicast route being based on the quantity of routing advertisement data of the broadcast packet.

13. The method of hybrid routing and forwarding for a wireless sensor network of claim 1 wherein the step of receiving the quantity of user data of the broadcast packet by the second node is performed at the same time as the receipt of the routing advertisement data.

14. The method of hybrid routing and forwarding for a wireless sensor network of claim 1 further comprising the step of transmitting, by the second node, a broadcast packet comprising the quantity of user data, and a second quantity of routing advertisement data.

15. A method of hybrid routing and forwarding for a mobile wireless sensor network utilizing a query specific data vehicle comprising the steps of:

broadcasting a query, by a coordinator node, to a plurality of nodes of a wireless sensor network, the query being sent in a broadcast packet comprising a quantity of route advertisement data, wherein the single broadcast packet comprises both the query data and the quantity of route advertisement data;

forming a unicast route to the coordinator node by one of the plurality of nodes based on the quantity of route advertisement data sent in the broadcast packet;

forming the query specific data vehicle by the one of the plurality of nodes;

forming a timer for the query specific data vehicle by the one of the plurality of nodes;

inserting a quantity of user data into the query specific data vehicle by the one of the plurality of nodes, the quantity of user data being destined for the coordinator node;

sending the query specific data vehicle along the unicast route;

receiving the query specific data vehicle by another of the plurality of nodes; and inserting a second quantity of user data into the query specific data vehicle by the another one of the plurality of nodes, the second quantity of user data being destined for the coordinator node.

16. The method of hybrid routing and forwarding for a wireless sensor network utilizing a query specific data vehicle of claim 15 further comprising the steps of:

forming a second query specific data vehicle by the another of the plurality of nodes;

forming a second timer for the second query specific data vehicle by the another of the plurality of nodes;

inserting the second quantity of user data into the second query specific data vehicle; and determining if the second quantity of user data can be inserted into the query specific data vehicle based on a maximum transfer unit value of the wireless sensor network.

17. The method of hybrid routing and forwarding for a wireless sensor network utilizing a query specific data vehicle of claim 15 wherein the single broadcast packet is uniquely identifiable by a node ID of the initiator node and a sequence number generated with each message from the initiator node.

18. A method of hybrid routing and forwarding for a wireless sensor network utilizing a wild card data vehicle comprising the steps of:
    sensing an recordable event by a wireless sensor node;
    creating a quantity of user data based on the sensing of the recordable event by the wireless sensor node;
    forming a wild card data vehicle by the wireless sensor node;
    inserting the quantity of user data formed by the wireless sensor node into the wild card data vehicle, the quantity of user data being destined for a coordinator node;
    forming a timer for the wild card data vehicle by the wireless sensor node;
    broadcasting the wild card data vehicle by the wireless sensor node to a second wireless sensor node;
    receiving the wild card data vehicle by the second wireless sensor node; and
    performing an acceptance check on each unit of user data in the wild card data vehicle by the second node;
    performing a loop check on each unit of user data in the wild card data vehicle by the second node.

19. The method of hybrid routing and forwarding for a wireless sensor network utilizing a wild card data vehicle comprising of claim 18 further comprising the step of:
    adding a second quantity of user data to the wild card data vehicle by the second wireless sensor node, the second quantity of user data being created by the second wireless sensor node based on a recordable event sensed by the second node.

20. The method of hybrid routing and forwarding for a wireless sensor network utilizing a wild card data vehicle comprising of claim 18 further comprising the steps of:
    inserting a quantity of route advertisement data into the wild card data vehicle by the wireless sensor node; and
    forming a unicast route to the coordinator node by the second wireless sensor node based on the quantity of route advertisement data sent in the wild card data vehicle.

\* \* \* \* \*